US007546464B2

(12) United States Patent
Hayashi et al.

(10) Patent No.: US 7,546,464 B2
(45) Date of Patent: Jun. 9, 2009

(54) NETWORK ACCESS TERMINAL, NETWORK SYSTEM, METHOD OF NETWORK SYSTEM, STORAGE MEDIUM, AND PROGRAM CODE

(75) Inventors: Junichi Hayashi, Kanagawa (JP); Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 10/170,707

(22) Filed: Jun. 14, 2002

(65) Prior Publication Data
US 2003/0009673 A1 Jan. 9, 2003

(30) Foreign Application Priority Data
Jun. 26, 2001 (JP) ............................... 2001-193560

(51) Int. Cl.
*H04L 9/00* (2006.01)
*H04N 7/16* (2006.01)
(52) U.S. Cl. ...................... 713/176; 713/154; 713/182; 725/29
(58) Field of Classification Search ................. 713/176, 713/154, 182; 725/29
See application file for complete search history.

(56) References Cited
U.S. PATENT DOCUMENTS

| 5,841,978 | A | 11/1998 | Rhoads | 395/200.47 |
|---|---|---|---|---|
| 6,411,725 | B1* | 6/2002 | Rhoads | 382/100 |
| 6,829,368 | B2* | 12/2004 | Meyer et al. | 382/100 |
| 6,948,068 | B2* | 9/2005 | Lawandy et al. | 713/176 |
| 2001/0054144 | A1* | 12/2001 | Epstein et al. | 713/161 |
| 2002/0033844 | A1* | 3/2002 | Levy et al. | 345/744 |
| 2002/0078178 | A1* | 6/2002 | Senoh | 709/219 |
| 2002/0083123 | A1* | 6/2002 | Freedman et al. | 709/203 |
| 2003/0040957 | A1* | 2/2003 | Rodriguez et al. | 705/14 |
| 2003/0163684 | A1* | 8/2003 | Fransdonk | 713/153 |
| 2006/0018506 | A1* | 1/2006 | Rodriguez et al. | 382/100 |

\* cited by examiner

*Primary Examiner*—Nasser G Moazzami
*Assistant Examiner*—Mohammad W Reza
(74) *Attorney, Agent, or Firm*—Fitzpatrick, Cella, Harper & Scinto

(57) ABSTRACT

When image data in which a digital watermark is embedded accesses a server, particularly, a Web server, via a network, the server is appropriately selected and accessed via the network in accordance with the environments of the clients that access the server. A network access terminal includes an extraction unit for extracting first information from an image that includes the first information, which is multi-valued, an acquisition unit for acquiring from a predetermined storage device the first information extracted by the extraction unit and address information specified by second information different from the first information, from among a plurality of address information stored in the predetermined storage device, and a communication unit for accessing an address based on the address information obtained by the acquisition unit.

13 Claims, 14 Drawing Sheets

FIG. 6

| ADDITIONAL INFORMATION | CLIENT INFORMATION | ADDRESS INFORMATION |
|---|---|---|
| ID_A | Inf_A1 | URL_A1 |
| | Inf_A2 | URL_A2 |
| ID_B | Inf_B1 | URL_B1 |
| | Inf_B2 | URL_B2 |
| ⋮ | ⋮ | ⋮ |
| | ⋮ | ⋮ |

FIG. 7

| ADDITIONAL INFORMATION | CLIENT INFORMATION | ADDRESS INFORMATION |
|---|---|---|
| ID_A | Inf_A1 | URL_C1 |
| | Inf_A2 | URL_C2 |
| ID_B | Inf_B1 | URL_B1 |
| | Inf_B2 | URL_B2 |
| ⋮ | ⋮ | ⋮ |
| | ⋮ | ⋮ |

FIG. 10A

| 1  | 15 | 14 | 4  |
|----|----|----|----|
| 12 | 6  | 7  | 9  |
| 8  | 10 | 11 | 5  |
| 13 | 3  | 2  | 16 |

| 1 |   |   | 4 |
|---|---|---|---|
|   | 6 | 7 |   |
| 8 |   |   | 5 |
|   | 3 | 2 |   |

| 1 | 8 | 7 | 2 |
|---|---|---|---|
| 6 | 3 | 4 | 5 |
| 4 | 5 | 6 | 3 |
| 7 | 2 | 1 | 8 |

| 1 | 4 | 4 | 1 |
|---|---|---|---|
| 3 | 2 | 2 | 3 |
| 2 | 3 | 3 | 2 |
| 4 | 1 | 1 | 4 |

| 0.7  | 0.7  | -0.6 | -0.6 |
|------|------|------|------|
| -0.7 | -0.7 | 0.6  | 0.6  |
| 0.9  | 0.9  | -0.8 | -0.8 |
| -0.9 | -0.9 | 0.8  | 0.8  |

1101

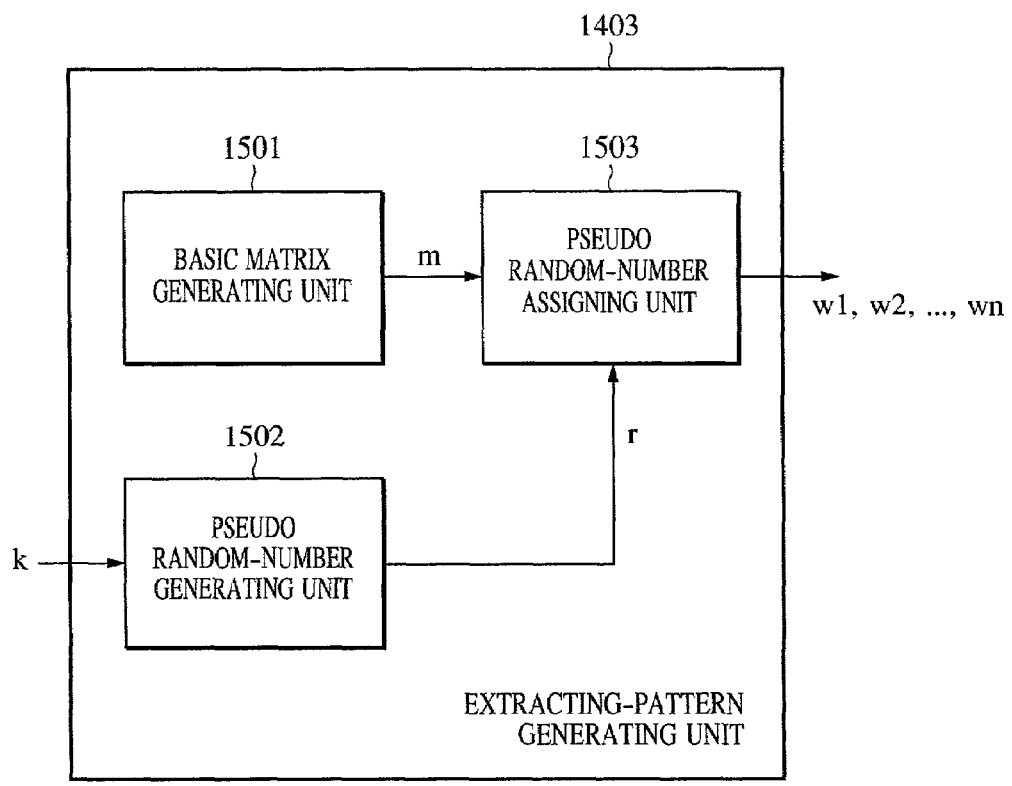

FIG. 17
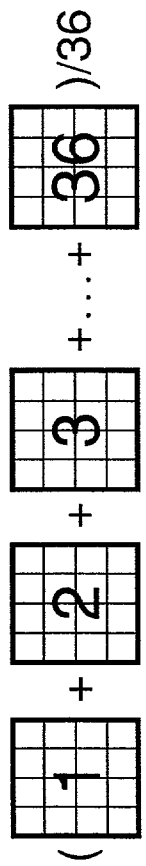
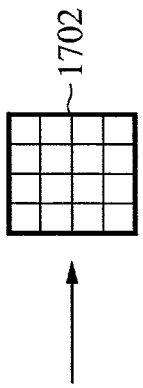
INTEGRATING IMAGE c
1702
1701

NETWORK ACCESS TERMINAL, NETWORK SYSTEM, METHOD OF NETWORK SYSTEM, STORAGE MEDIUM, AND PROGRAM CODE

BACKGROUND OF THE INVENTION

1. Field of the Invention

The present invention relates to a network access terminal for accessing a network, a network system, a method of the network system, a storage medium, and a program code.

2. Description of the Related Art

Hitherto, due to the rapid development and spread of computers and networks thereof, various types of information, such as text data, image data, and audio data, now consist of digital data. Digital information does not deteriorate with age, and can completely be stored semi-permanently. However, digital information can easily be copied and, thus, copyright protection becomes a serious concern. Security techniques for copyright protection has rapidly increased in importance.

One of the security techniques for copyright protection is use of a digital watermark. In the digital watermark technique, a name of a copyright holder, a copyright purchaser ID, and the like are embedded in the digital image data, the digital audio data, the digital text data, etc., so that they cannot be known by a third party and unauthorized use, such as illegal copying is prevented.

Further, although the digital watermark technique was originally used for copyright protection, it is frequently used for another purpose. For example, as disclosed in U.S. Pat. No. 5,841,978, a digital watermark technique uses image data as a hot link for accessing a Web site. According to this digital watermark technique, URL information is embedded in the image data as a digital watermark, and the image data including the URL information is distributed. A user extracts the URL information embedded as the digital watermark from the image data that includes the digital watermark, and accesses the image data based on the extracted URL information via a network. Consequently, the image data can be used as a hot link for accessing the Web site.

As mentioned above, according to the digital watermark technique, image data can be used efficiently as a hot link for accessing a Web server by embedding URL information in the image data. However, according to the conventional watermark technique, image data that includes URL information as a digital watermark functions only as a hot link for accessing a specified Web server. Therefore, it is not possible to access different Web servers, depending on the type of terminals for accessing the Web servers, access positions, and access time.

For example, on a personal computer, content on a Web site can be browsed on a relatively large screen. However, on a cell phone or a PDA, the same content on the Web site cannot be browsed, on the relatively smaller screens. Although on a personal computer, the Web site can be accessed at a relatively high speed, on a cell phone or PDA, the Web site usually is accessed at a relatively low speed. Further, although the personal computer has a relatively large processing capacity, and storage capacity, and content requiring a great deal of processing and having a large capacity can be browsed, the cell phone and the PDA have a relatively small processing capacity and storage capacity, and content requiring a great deal of processing and having a large capacity cannot be browsed. Therefore, in general, the Web server has first content for access from the personal computer and second content for access from the cell phone and the PDA. In many cases, the first content is browsed using the personal computer, and the second content is browsed using the cell phone and the PDA. However, according to conventional practice, a single web server must be accessed both by network access via the generally used personal computer and by network access via the cell phone and the PDA, irrespective of the different contents of that web server.

In many cases, the Web server independently has content described by a first language to facilitate browsing from a first country and content described by a second language to facilitate browsing from a second country, so that a plurality of countries can easily browse the Web site. However, according to conventional practice, a single Web server must be accessed from both the first and second countries, irrespective of the different languages.

SUMMARY OF THE INVENTION

The present invention is devised in consideration of the above-mentioned problems, and it is an object of the present invention to appropriately select a server, in accordance with the environment of a client for accessing the server, and to access a network when image data including a digital watermark accesses the server, in particular, a Web server via the network.

To accomplish the above object, there is provided a network access terminal, comprising: an extraction unit for extracting first information from an image in which the first information is embedded; an acquisition unit for acquiring from a predetermined storage device, the first information extracted by the extraction unit, address information from among a plurality of address information stored in the predetermined storage device specified by the extraction unit, and second information different from the first information; and a communication unit for accessing an address based on the address information acquired by the acquisition unit.

Further objects, features and advantages of the present invention will become apparent from the following description of the preferred embodiment, with reference to the attached drawings.

BRIEF DESCRIPTION OF THE DRAWINGS

FIG. 6 is a table showing one example of a registration to a database 403;

FIG. 7 is a table showing another example of a registration to the database 403;

FIGS. 10A to 10D are diagrams showing examples of a basic matrix m;

FIG. 11 is a schematic diagram showing one example of a digital watermark w;

FIG. 15 is a block diagram schematically showing a basic structure of an extracting-pattern generating unit 1403 according to the embodiment;

FIGS. 16A to 16D are diagrams showing examples of extracting patterns;

FIG. 17 is a diagram for explaining an integrating image c; and

DESCRIPTION OF THE PREFERRED EMBODIMENT

Below is a detailed description of a preferred embodiment of the present invention, with reference to the drawings.

Figure 1:
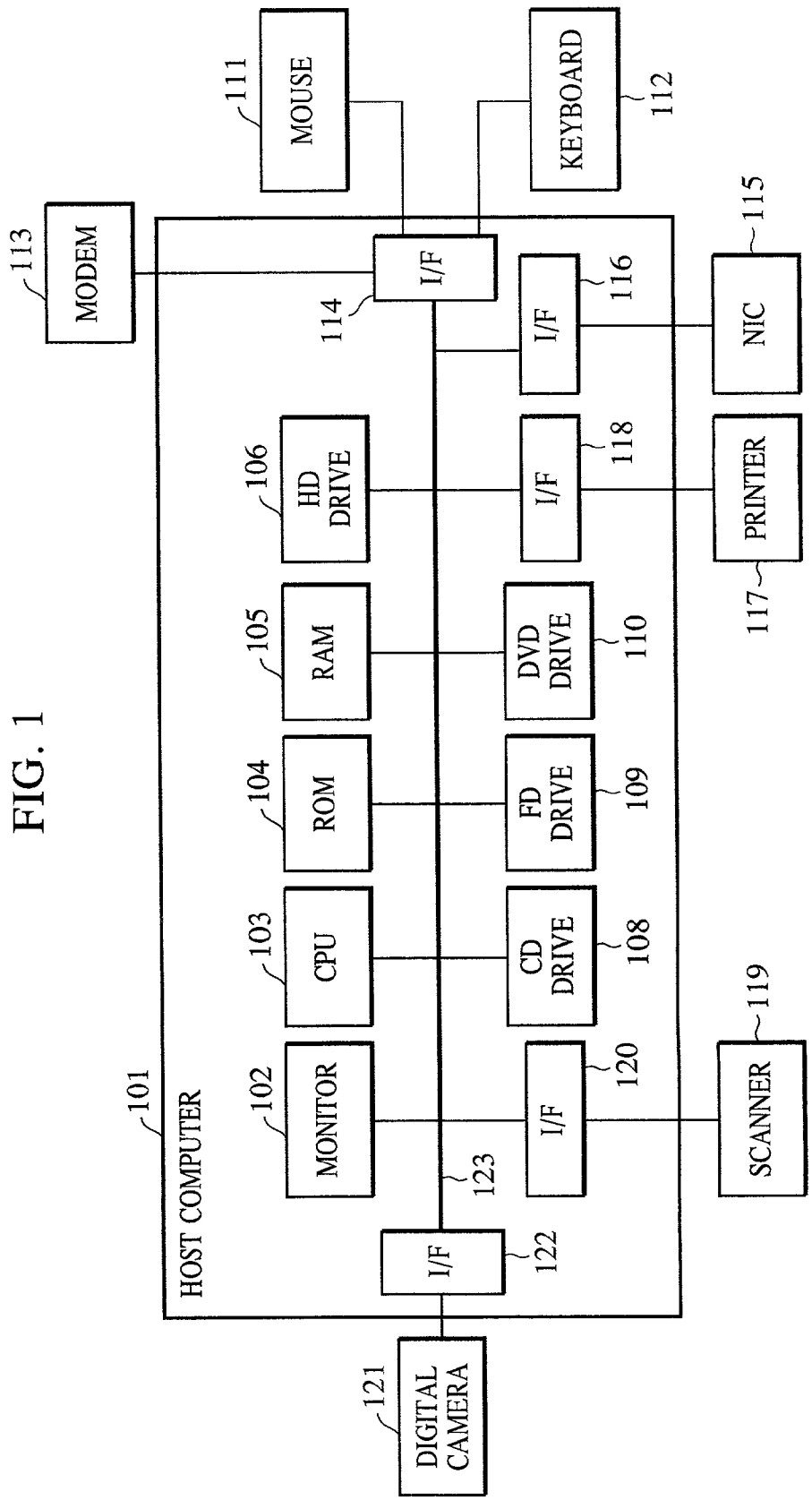
FIG. 1 is a block diagram of the overall structure of a network access terminal for accessing a network according to an embodiment of the present invention.

FIG. 1 is a schematic diagram showing the overall structure of a network access terminal for accessing a network according to the embodiment. Referring to FIG. 1, a host computer 101 is, for example, a widely used personal computer, which can be inputted with an image read from a scanner 119 and which can edit and store that image. Further, the host computer 101 can be inputted with an image captured by a digital camera 121 and can edit and store that image. Furthermore, the host computer 101 can print the inputted images using a printer 117. A user's instructions are inputted from a mouse 111 and/or a keyboard 112. In addition, the host computer 101 can receive and transmit data from and to another computer by a modem 113 and an NIC 115.

In the host computer 101, blocks, which will be described later, are connected via a bus 123 and are used in receiving and transmitting data.

Referring to FIG. 1, reference numeral 102 denotes a monitor for displaying data.

Reference numeral 103 denotes a CPU for controlling the host computer 101 using a program and data stored in memories such as a ROM 104 and a RAM 105, and for performing image processing and connection processing to a network.

Reference numeral 104 denotes the ROM on which is stored, a control program, etc., for controlling an image processing program as well as the overall terminal.

Reference numeral 105 denotes the RAM, which has an area for temporarily storing programs for performing image processing and control. The programs are inputted to the terminal, and information, data such as a program and data loaded from a CD (Compact Disk) drive 108, an FD (Floppy Disk) drive 109, or a DVD (Digital Versatile Disk) drive 110, or a program and data downloaded via the network, are temporarily stored. The RAM 105 also has a work area for performing various processes of the CPU 103.

Reference numeral 106 denotes an HD (Hard Disk) drive, which stores a program and data read from a drive, such as the CD drive 108, the FD drive 109, and the DVD drive 110, or a program and data downloaded from the network. Further, the HD drive 106 stores data after it has been processed.

Reference numeral 108 denotes the CD drive, which reads and writes data stored in a CD or a CD-R as an external storage medium. Reference numeral 109 denotes the FD drive which reads data from an FD and writes data to the FD. Reference numeral 110 denotes the DVD drive, which reads data from a DVD and writes data to the DVD. When a program for image editing is stored in the CD, the FD, or the DVD, the program is installed on the HD drive 106 via a respective drive for each storage medium and is transferred to the RAM 105 when necessary.

Reference numeral 114 denotes an interface (I/F) connected to the mouse 111, the keyboard 112, and the modem 113, for receiving an instruction inputted from the mouse 112 or the keyboard 112, or for receiving and transmitting data from and to another computer via the modem 113.

Reference numeral 116 denotes an interface (I/F) connected to the HD drive 106, the CD drive 108, the FD drive 109, and the DVD drive 110, for receiving and transmitting various data stored in the HD drive 106, the CD drive 108, the FD drive 109, and the DVD drive 110 from and to another computer via the NIC 115.

Reference numeral 118 denotes a printer interface (I/F) connected to the HD drive 106, the CD drive 108, the FD drive 109, and the DVD drive 110, for transferring image data and text data stored in the HD drive 106, the CD drive 108, the FD drive 109, and the DVD drive 110 to the printer 117 to be printed on a sheet medium.

Reference numeral 120 denotes an interface (I/F) connected to the HD drive 106 and the RAM 105, for receiving image data inputted from the scanner 119 and storing the image data to the HD drive 106 or the RAM 105.

Reference numeral 122 denotes an interface (I/F) connected to the HD drive 106 and the RAM 105, for receiving image data captured by the digital camera 121 and storing the image data to the HD drive 106 or the RAM 105.

Figure 2:
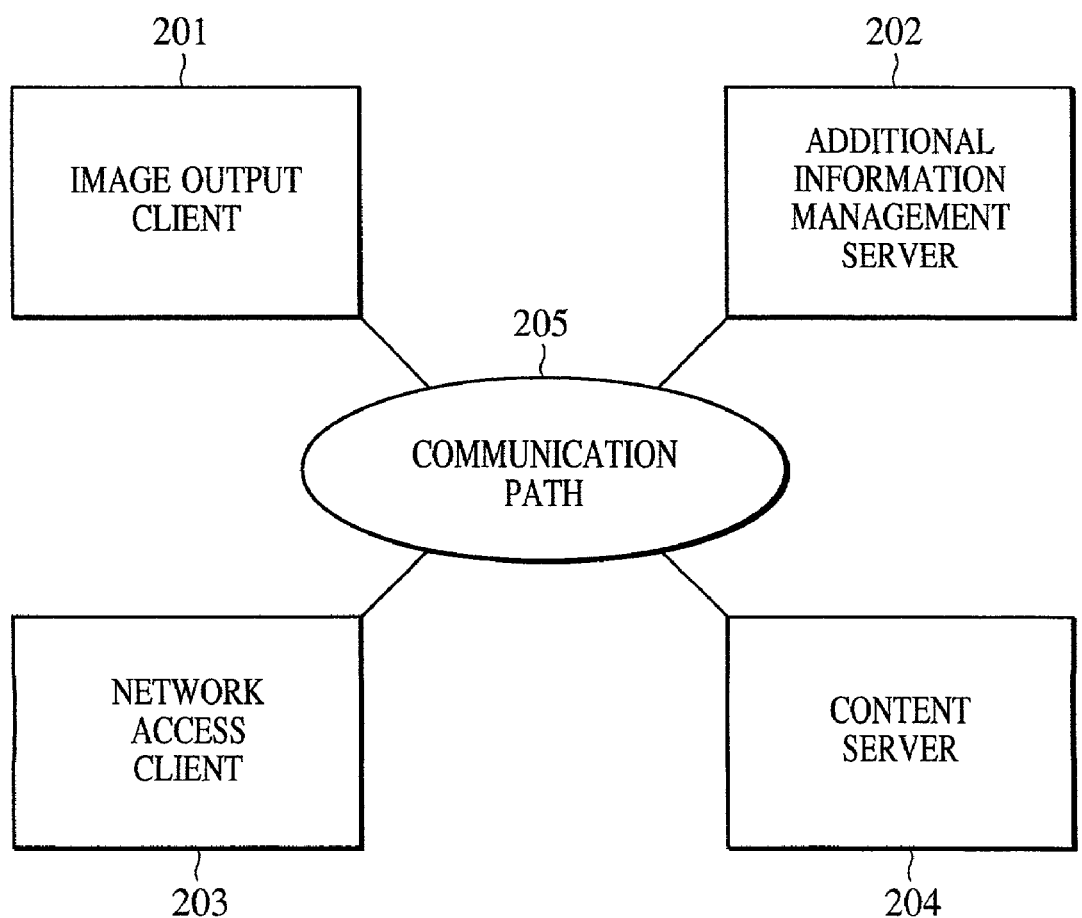
FIG. 2 is a block diagram showing the overall structure of a network system including a server and a client according to the embodiment.

Next, a description is given of the overall structure of a system that includes a server and an access terminal of a client (hereinafter, simply referred to as a client) according to the embodiment. FIG. 2 is a diagram showing the overall structure of the network system. Referring to FIG. 2, the network system includes an image output client 201, an additional information management serer 202, a network access client 203, and a content server 204. The server and the client are personal computers. Alternatively, the server and/or the client may be a portable unit, such as a PDA or a cell phone.

The server and the client are connected via a communication path 205. The communication path 205 is a bidirectional communication path, such as the Internet, and is physically connected by a lead wire or an optical fiber, is connected by radio waves, or is connected by a combination thereof. The server and the client can receive and transmit information by receiving and transmitting a predetermined code string via the communication path 205. Further, the code string may be subjected to encryption so as to prevent illegal use of the code string. The operation of the server and the client will be described hereinbelow.

(1) Content Server

First, a function of a content server 204 will be described. The content server 204 stores various items of and can provide the content in accordance with a request for the content from the client. The content may include text information, image information (still image/moving image), audio information, program information, and any combination of such information. The content server 204 and the content stored in the content server 204 have address information for specifying a location on the network. The client can access the content server 204 or the content stored therein by using the address information. For example, a Web server can be used as the content server 204. When the Web server is used as the content server 204, the content is described by an HTML language, and the address information of the content server 204 is designated by a URL.

(2) Image Output Client

Figure 3:
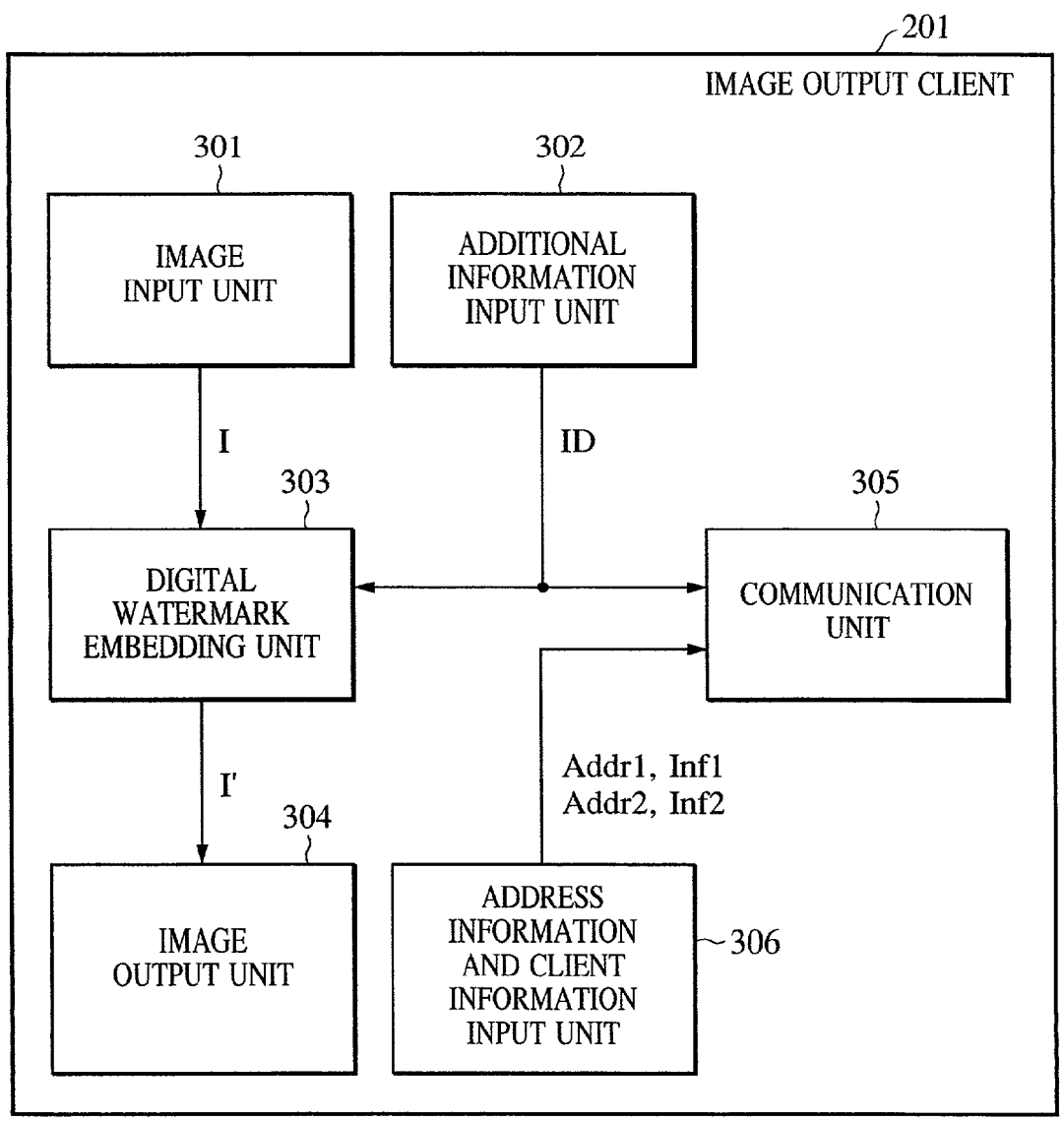
FIG. 3 is a block diagram showing a functional configuration of an image output client 201 according to the embodiment.

Next, a function of the image output client 201 will be described. FIG. 3 is a block diagram showing a functional configuration of the image output client 201 according to the embodiment. Referring to FIG. 3, the image output client 201 includes an image input unit 301, an additional information input unit 302, a digital watermark embedding unit 303, an image output unit 304, a communication unit 305, and an address information and client information input unit 306. The image output client 201 has a structure similar to that shown in FIG. 1.

An original image I and additional information ID are inputted to the image output client 201. Then, the additional information ID is embedded in the original image I as a digital watermark and image data I', which includes the additional information ID, is outputted. First address information Addr1, first client information Inf1, second address information Addr2, and second client information Inf2, associated with the additional information ID, are inputted to the image output client 201. The inputted first address information Addr1, first client information Inf1, second address information Addr2, and second client information Inf2 are transmitted to the additional information management server 202. The additional information, the address information, and the client information will be described later.

A function of the image input unit 301 will be described next. The image input unit 301 inputs the image data I. In the case of inputting to the image input unit 301, an original is read from the scanner 119, image data is captured by the digital camera 121, image data is read from the HD drive 106, the CD drive 108, the FD drive 109, or the DVD drive 110, or the image data I is inputted by receiving image data from the modem 113 or the NIC 115. Therefore, the image input unit 301 functions as these equipment.

The image data I inputted to the image input unit 301 is temporarily stored in the RAM 105 for subsequent processing. However, if the capacity of the RAM 105 is smaller than the capacity (size) of the image data I, the HD drive 106 is also used. The inputted image data I is outputted from the image input unit 301 and is inputted to the digital watermark embedding unit 303.

Next, a function of the additional information input unit 302 will be described. The additional information input unit 302 inputs an additional information ID. The additional information ID is a identifier for identifying the image data I. The additional information ID includes information inputted by a user through the mouse 111 and/or the keyboard 112 and information issued by the additional information management server 202, which will be described later.

A function of the digital watermark embedding unit 303 will be described next. The digital watermark embedding unit 303 embeds, as an invisible digital watermark, the additional information ID inputted by the additional information input unit 302 into the image data I inputted by the image input unit 301. A specific embedding method of the invisible digital watermark will be described later. The image data I', which includes the digital watermark, is outputted from the digital watermark embedding unit 303 and is inputted to the image output unit 304.

A function of the image output unit 304 will be described next. The image output unit 304 outputs the image data I' which includes the additional information ID. The image output unit 304 can print out the data to a sheet medium by using the printer 117, can record the data to an external storage medium by using the HD drive 106, the CD drive 108, the FD drive 109, or the DVD drive 110, and can transmit the data to external equipment or another computer by using the NIC 115.

Next, a function of the address information and client information input unit 306 will be described. The address information and client information input unit 306 inputs the first address information Addr1, first client information Inf1, second address information Addr2, and second client information Inf2.

The address information corresponds to information for specifying the location of the content server 204 on the communication path 205 (or the location of the content of the content server 204) upon communication via the communication path 205 in FIG. 2. For example, the address information includes a URL in WWW. The address information of the content server 204 to be browsed or used by a user of the image data I' is inputted by using the address information and client information input unit 306.

The client information corresponds to information indicating various statuses of the network access client, which will be described later. For example, time information upon accessing the content server by using the network access client, location information, and information on the type of terminal can be set as the client information. Further, the first client information Inf1 is associated with the first address information Addr1, and the second client information Inf2 is associated with the second address information Addr2.

If information "0:00 to 12:00" is set as the first client information Inf1 and information "12:00 to 24:00" is set as the second client information Inf2, a user can access the content server having the first address information Addr1 upon accessing the network at 0:00 to 12:00 and he can access the content server having the second address information Addr2 upon accessing the network at 12:00 to 24:00.

If information "Japan" is set as the first client information Inf1 and information "U.S. America" is set as the second client information Inf2, the user can access the content server having the first address information Addr1 upon accessing the network from Japan and he can access the content server having the second address information Addr2 upon accessing the network from U.S. America.

If information "PC" is set as the first client information Inf1 and information "cell phone" is set as the second client information Inf2, the user can access the content server having the first address information Addr1 upon accessing the network by using the PC and he can access the content server having the second address information Addr2 upon accessing the network by using the cell phone.

As mentioned above, a user's desired information, address information, and client information can be inputted through the mouse 111 and/or the keyboard 112. The information stored in advance in the ROM 104 or the HD drive 106 may be set as the address information and the client information.

The additional information ID inputted by the additional information input unit 302, and the address information and client information inputted by the address information and client information input unit 306 are transmitted to the additional information management server 202 via the communication unit 305.

(3) Additional Information Management Server

Figure 4:
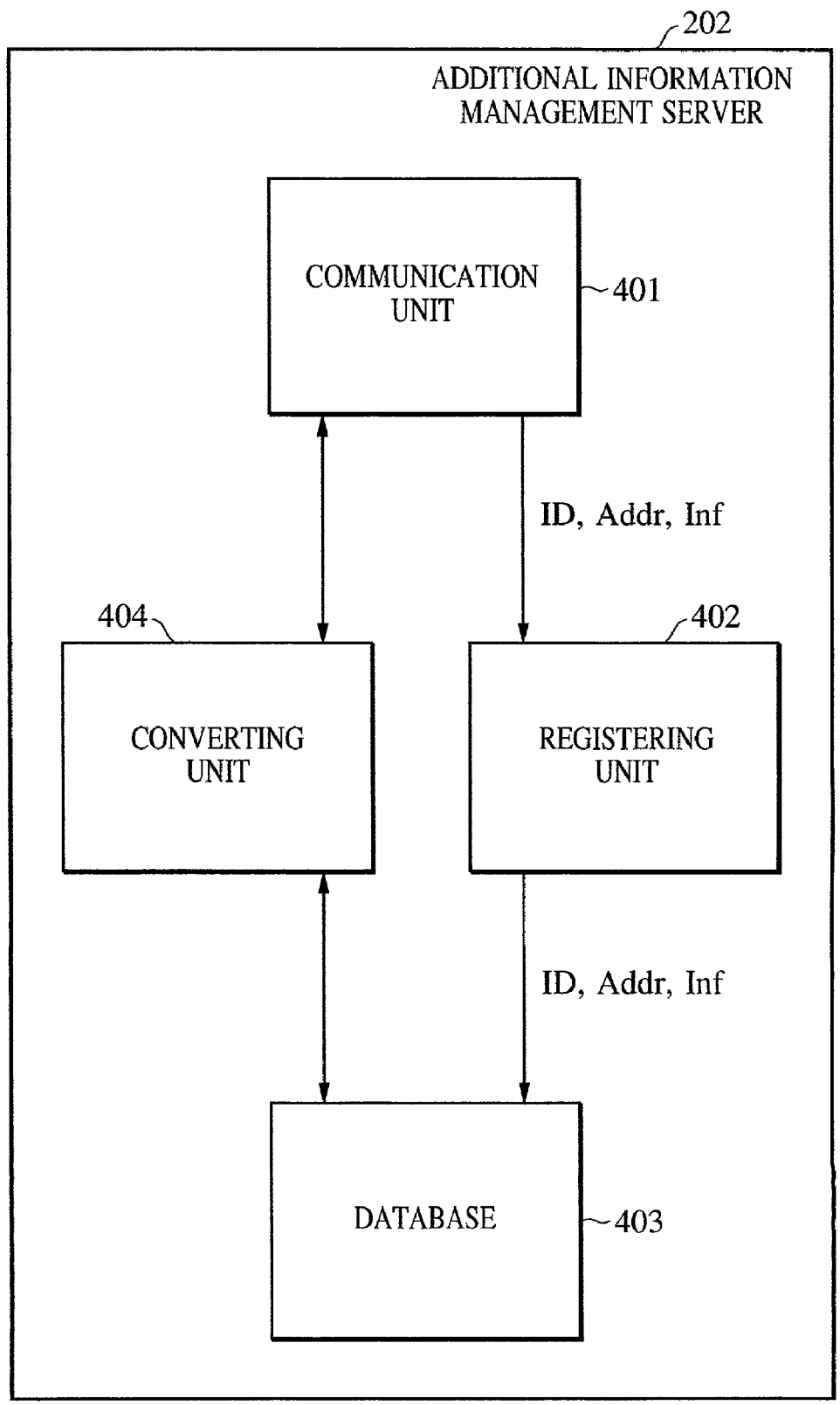
FIG. 4 is a block diagram showing a functional configuration of an additional information management server 202 according to the embodiment.

Next, a function of the additional information management server 202 will be described. FIG. 4 is a block diagram for explaining a functional configuration of the additional information management server 202 according to the embodiment. Referring to FIG. 4, the additional information management server 202 includes a communication unit 401, a registering unit 402, a database 403, and a converting unit 404.

The additional information management server 202 receives the additional information ID, the first address information Addr1, the first client information Inf1, the second address information Addr2, and the second client information Inf2 via the communication unit 401. The received additional information ID, address information, and client information are outputted to the registering unit 402.

A function of the registering unit 402 will be described next. The additional information ID, the address information, and the client information are inputted to the registering unit 402, and are registered to the database 403. In this case, the information is registered to the database 403 so that the address information can be referred to based on the additional information ID and the client information.

FIG. 6 is a table showing one example of the registration to the database 403. Referring to FIG. 6, the database 403 registers additional information "ID_A", client information "Inf_A1", address information "URL_A1" in association with each other, and the additional information "ID_A", client information "Inf_A2", address information "URL_A2" in association with each other. The additional information "ID_A" and the client information "Inf_A1" can be converted into the address information "URL_A1" by using the converting unit 404, which will be described later. Further, the additional information "ID_A" and the client information "Inf_A2" can be converted into the address information "URL_A2" by using the converting unit 404.

The above-mentioned processing in the image output client 201 and the additional information management server 202 is executed, not via an operator's manual operation, after inputting of the image data I by the image input unit 301 in FIG. 3, the additional information ID by the additional information input unit 302, and the address information and the client information by the address information and client information input unit 306.

Although the additional information management server 202 is independently provided according to the embodiment, the present invention is not limited to this. For example, when the network access client 203, such as a general personal computer and a work station, is larger than a PDA, the database 403 may be arranged in the HD drive 106 and another converting unit 404 and another registering unit 402 may be arranged in the network access client 203. As a result, the address information can be specified based on the additional information and the client information, not via the communication path 205.

(4) Network Access Client

Figure 5:
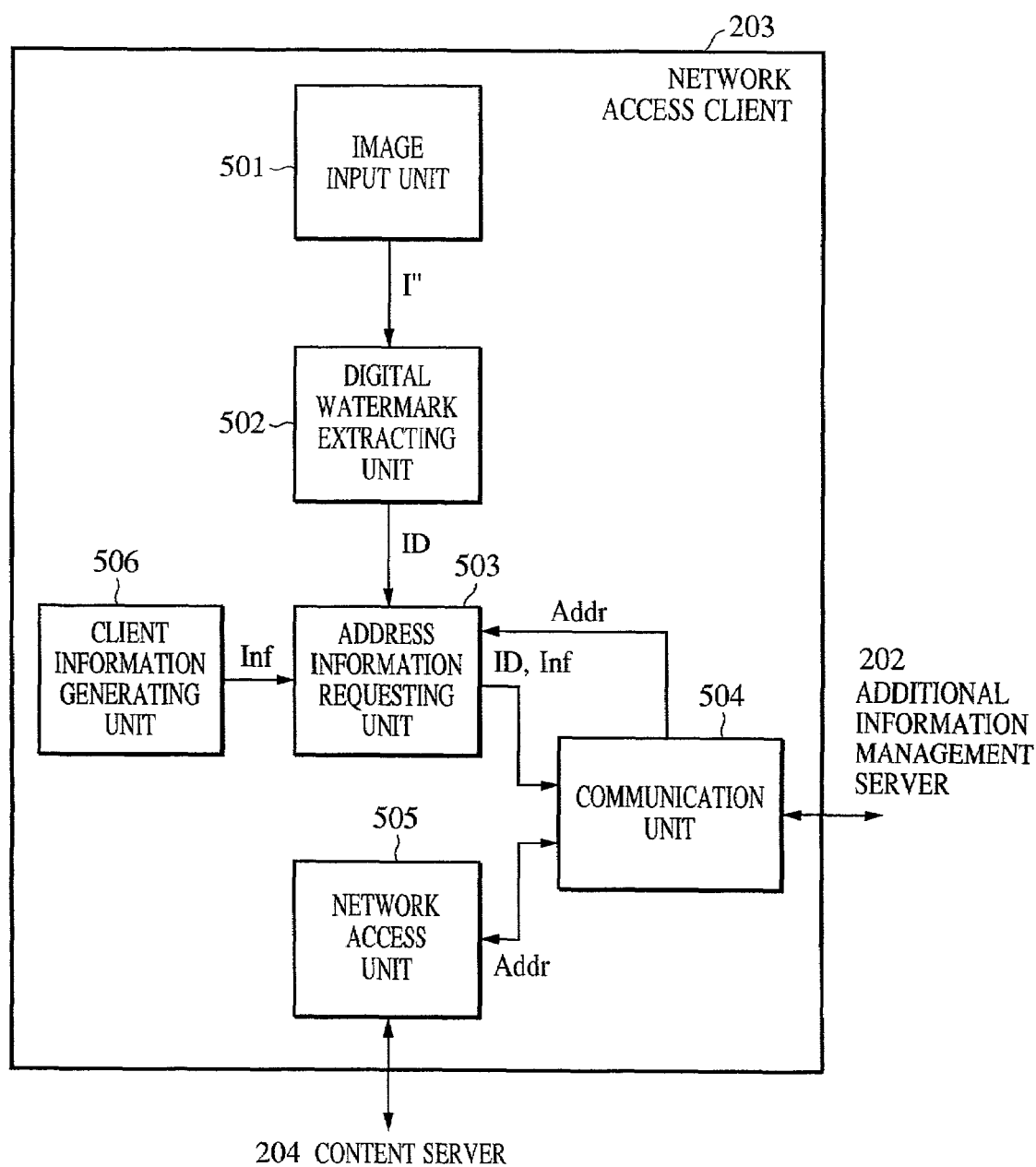
FIG. 5 is a block diagram showing a functional configuration of a network access client 203 according to the embodiment.

A function of the network access client (network access terminal) 203 will be described next. FIG. 5 is a block diagram for explaining a functional configuration of the network access client 203 according the embodiment. Referring to FIG. 5, the network access client 203 comprises an image input unit 501, a digital watermark extracting unit 502, an address information requesting unit 503, a communication unit 504, a network access unit 505, and a client information generating unit 506. The network access client 203 includes the structure of the host computer 101 shown in FIG. 1, the NIC 115, and the modem 113.

The image data I' (image data in which the additional information ID is embedded as a digital watermark) outputted from the image output client 201 is inputted to the network access client 203. The network access client 203 can access the content server 204 by using the inputted image data I'.

Next, a function of the image input unit 501 will be described. The image input unit 501 inputs image data I". A function of the image input unit 501 is the same as that of the image input unit 301 shown in FIG. 3, and a detailed description thereof is omitted here. The image data I" inputted by the image input unit 501 may be the image data I' in which the additional information ID is embedded as the digital watermark, or the original image data I. Further, the image data I' may be image data obtained by executing various image processing on the image data I' in which the additional information ID is embedded as the digital watermark.

Next, a function of the digital watermark extracting unit 502 will be described. The image data I" is inputted to the digital watermark extracting unit 502, and it is determined whether or not the additional information ID is embedded in the image data I". If it is determined that the additional information is embedded in the image data I", the digital watermark extracting unit 502 extracts the additional information ID and outputs the extracted additional information ID. On the other hand, if it is determined that the additional information is not embedded in the image data I", the digital watermark extracting unit 502 cancels the processing, and the fact that the additional information ID is not embedded is displayed on the monitor 102. A detailed description is given later of the digital watermark extracting process, which is executed by the digital watermark extracting unit 502. The outputted additional information ID is inputted to the address information requesting unit 503.

Next, a function of the client information generating unit 506 is described. The client information generating unit 506 generates client information Inf. As described with reference to FIG. 3, included in the client information Inf are the time information, the position information, and the information on the type of terminals. Specifically, the client information generating unit 506 receives the client information Inf, which the client inputs by using the keyboard 112 and/or the mouse 111. Alternatively, the client information generating unit 506 may read the time information, the position information, and the information on the type of terminals, which are stored in advance, and may generate the client information Inf. The generated client information Inf is inputted to the address information requesting unit 503.

A function of the address information requesting unit 503 is described next. The extracted additional information ID and the generated client information Inf are inputted to the address information requesting unit 503. Then, the address information requesting unit 503 obtains and outputs address information Addr in association with the inputted additional information ID and client information Inf.

Next, a description is given of a process for obtaining and outputting the address information Addr by the address information requesting unit 503. The inputted additional information ID and client information Inf are transmitted to the additional information management server 202 shown in FIG. 2 by using the communication unit 504. It is assumed that an address of the additional information management server 202 via the communication path 205 is stored in the RAM 105 in advance. The additional information management server 202 can be accessed by referring to the address of the additional information management server 202 via the communication path 205. For example, a processing program and data for obtaining the address information are stored in the RAM 105. The data includes an address of the additional information management server 202, and the address is connected accessed by execution of the processing program.

The additional information management server 202 receives the additional information ID and the client information Inf, which are transmitted via the communication unit 401 shown in FIG. 4. The received additional information ID and client information Inf are outputted to the converting unit 404. The converting unit 404 obtains the address information Addr in association with the additional information ID and the client information Inf by using the inputted additional information ID and the client information Inf and referring to the database 403. The obtained address information Addr is transmitted to the network access client 203 shown in FIG. 2 via the communication unit 401. The network access client 203 receives the address information Addr via the communication unit 504 and outputs the received address information Addr to the address information requesting unit 503. The converted address information Addr is further outputted to the network access unit 505.

Next, a function of the network access unit 505 will be described. In the network access unit 505, access to the content server 204 is started by using the inputted address information Addr. Detailed processes for accessing the content server 204 by using the address information Addr is well-known in the art, and a detailed description thereof is omitted.

The description has been given above of the processing flow from inputting the image data I" by the image input unit 501 to accessing the content server 204 by the network access unit 505.

Next, a description is given of a case in which, after outputting the image data I' in which the image output client 201 has embedded the additional information ID_A (corresponding to the address information URL_A1 and the address information URL_A2) as a digital watermark, the address information of the content server 204 corresponding to the address information URL_A1 and the address information URL_A2 is changed to address information URL_C1 and URL_C2 different from the address information URL_A1 and URL_A2.

In many cases, the content server 204 is operated or used independently of the embodiment. Therefore, the address information of the content server 204 might be changed. If the address information of the content server 204 is changed, the content server 204 cannot be accessed because the content server 204 does not exist on the network indicated by the address information Addr in association with the additional information ID, even when the network access client 203 access the content server 204 by using the image data I' (in which the additional information ID is embedded as the digital watermark).

To solve the above problem, the address information URL_A1 and URL_A2 of the content server 204, associated with the additional information ID, are changed to the address information URL_C1 and URL_C2 different from the address information URL_A1 and URL_A2. The content of the database 403 shown in FIG. 4 needs to be updated. That is, the address information associated with the additional information ID is changed from the address information URL_A1 and URL_A2 to the address information URL_C1 and URL_C2. Thus, the additional information ID extracted from the image data I' is converted to the address information URL_C1 or URL_C2, thereby accessing a desired content server.

Next, a description is given of the change in address information with reference to FIGS. 6 and 7. Referring to FIG. 6, the image output client 201 embeds the address information "URL_A1" as the additional information "ID_A" into the image data I'. When the address information "URL_A1" of the content server is changed to the address information "URL_C1" after generating the image data I', referring to FIG. 7, the address information "URL_A1" corresponding to the additional information "ID_A" is changed to the address information "URL_C1". Thus, if the address of the content server is changed, any desired content server can be access by using the system according to the embodiment.

(5) Embedding of Digital Watermark

Figure 8:
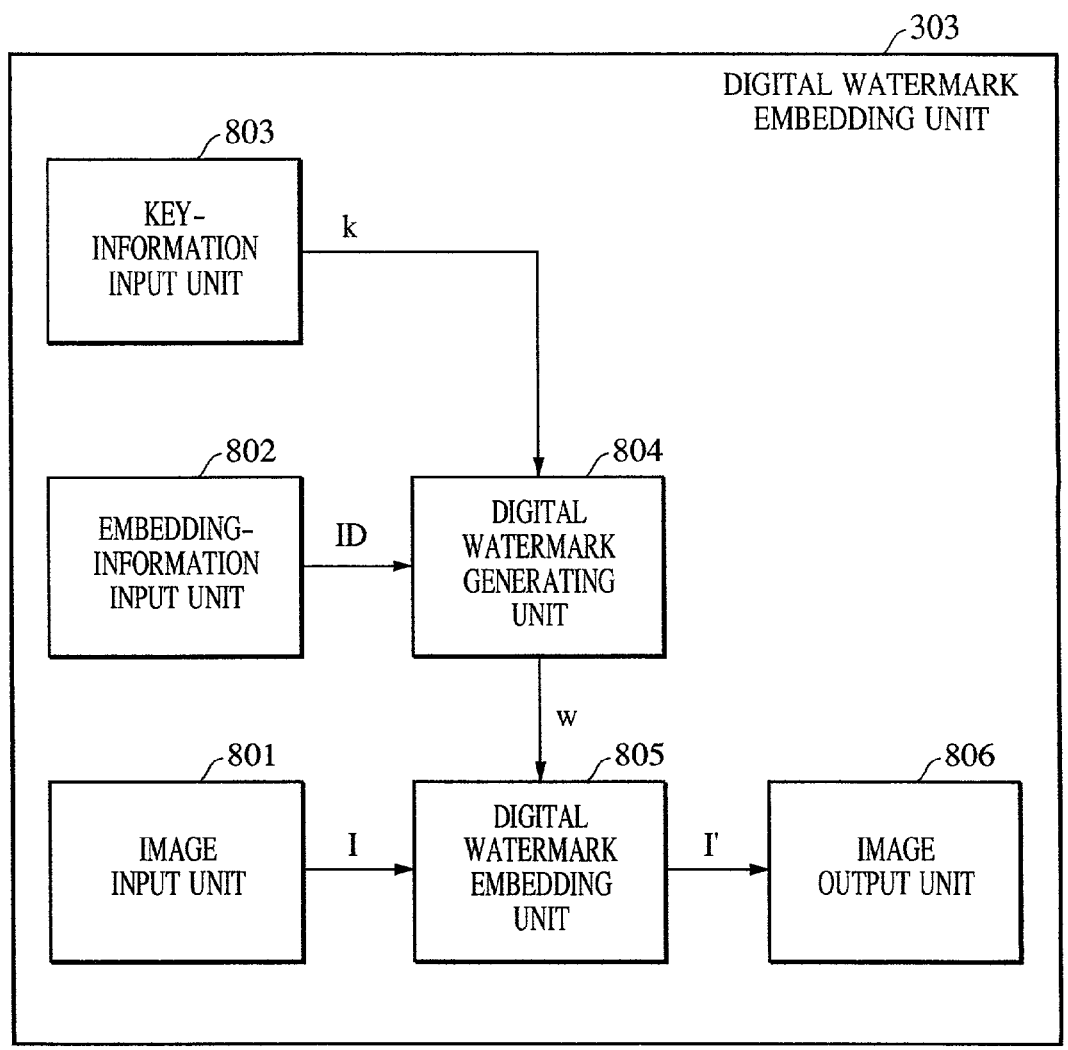
FIG. 8 is a block diagram showing a functional configuration of a digital watermark embedding unit 303 according to the embodiment.

The digital watermark embedding unit 303 will be described hereinbelow with reference to FIG. 8. FIG. 8 is a diagram showing a functional configuration of the digital watermark embedding unit 303.

A "digital watermark", which is described hereinbelow, is an invisible digital watermark, and changes the original image data I but can hardly be recognized visually by a human being. An amount of change brought about by the combination thereof indicates additional information.

Referring to FIG. 8, the digital watermark embedding unit 303 includes an image input unit 801, an embedding-information input unit 802, a key-information input unit 803, a digital watermark generating unit 804, a digital watermark embedding unit 805, and an image output unit 806. Incidentally, the embedding process described herein may be implemented by a software process. In this case, it is assumed that the above-mentioned components conceptually represent functions necessary for the software process.

First, a function of the image input unit 801 will be described. The image data I as an embedding target of the digital watermark is inputted to the image input unit 801. The image data I is outputted from the image input unit 801 and is inputted to the digital watermark embedding unit 805.

In the following description, the image data I indicates a multi-valued image of a monochrome image for a brief description. However, the present invention is not limited to this. For example, when the digital watermark is embedded into image data consisting of a plurality of color components, such as color image data, each of the RGB components consisting of color components or each luminance and color difference is handled as the multi-valued components of the monochrome image and the digital watermark may be embedded to the components. In this case, as compared with the case of embedding a digital watermark into a multi-valued monochrome image, approximately three times the amount of data can be embedded.

A function of the embedding-information input unit 802 will be described next. In the embedding-information input unit 802, a binary data string to be embedded as the digital watermark in the image data I. The binary data string is outputted from the embedding-information input unit 802 and is inputted to the digital watermark generating unit 804.

Hereinbelow, the binary data string is described as the additional information ID. The additional information ID is formed by combining several numbers of bits indicating "0" and "1". A number of bits indicates copyright information for specifying an author of the image data I or user information for specifying a user of the image data I. Alternatively, a number of bits indicates a code for identifying the image data I (because the additional information ID corresponds to an identifier for identifying the image data I).

Then, the additional information ID may be encrypted to prevent easy misuse of the additional information ID. Optionally, the additional information ID may be subjected to error correction encoding so that correct additional information ID can be extracted, when the image data I including the additional information ID as the digital watermark is subjected to a change of content (hereinafter, referred to as "attack"), so as to prevent the extraction of the additional information ID from the image data I by a user's intentional operation.

Incidentally, the above-mentioned attack includes an unintentional attack. For example, it is possible for general image processing (lossy compression, luminance correction, geometrical conversion, filtering, etc.) to remove the digital watermark, and even an attack in this case is included in the above-mentioned attack.

The encryption processing and error correction encoding are well known and, therefore, a description thereof is omitted. An example of embedding the additional information ID having n bits will be described below.

A function of the key-information input unit 803 will be described next. The additional information ID is embedded into the key-information input unit 803 and key information k necessary for extraction is inputted thereto. The key information k is outputted from the key-information input unit 803 and is inputted to the digital watermark generating unit 804.

Herein, the key information k is a real number indicated by L bits (where L is a positive number). If L is 8, for example, "01010101" is an example of key information. If the key information k is expressed as a positive integer, "85" is an example of such an integer. The key information k is given as an initial value in processing for generating a pseudo random-number, executed by a pseudo random-number generating unit 902, which will be described later. The additional information ID embedded as the digital watermark can correctly be extracted only when common key information k is used in the digital watermark embedding unit and a digital watermark extracting unit, which will be described later. In other words, only a user having the key information k can correctly extract the additional information ID.

Next, a function of the digital watermark generating unit 804 will be described. The additional information ID from the embedding-information input unit 802 and the key information k from the key-information input unit 803 are inputted to the digital watermark generating unit 804. A digital watermark w is generated and outputted based on the inputted additional information ID and key information k.

Figure 9:
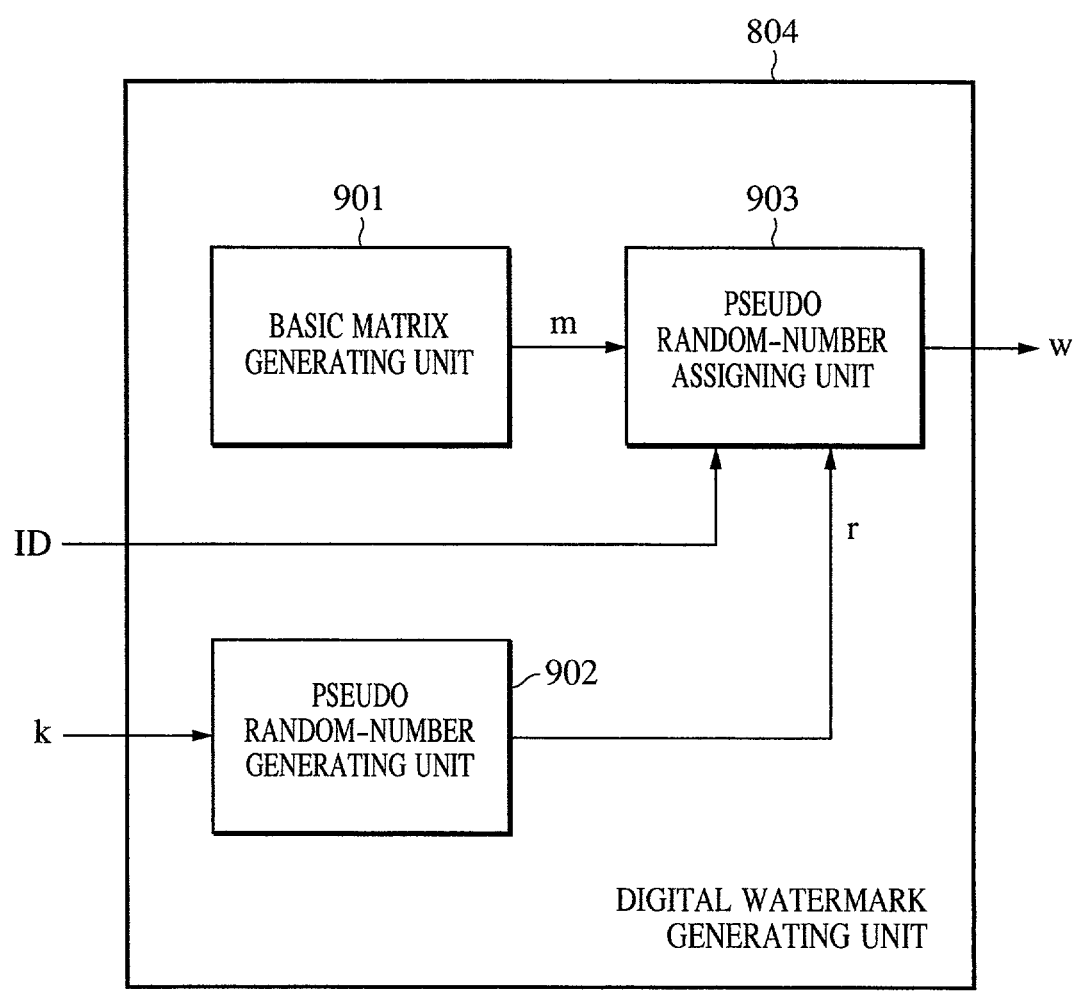
FIG. 9 is a block diagram showing a functional configuration of a digital watermark generating unit 804.

A function of the digital watermark generating unit 804 will be described next with reference to FIG. 9. FIG. 9 is a diagram showing a functional configuration of the digital watermark generating unit 804. Referring to FIG. 9, the digital watermark generating unit 804 includes a basic-matrix generating unit 901, a pseudo random-number generating unit 902, and a pseudo random-number assigning unit 903.

A function of the basic-matrix generating unit 901 will be described next. The basic-matrix generating unit 901 generates a basic matrix m, which is inputted to the pseudo random-number assigning unit 903. The basic matrix m allows a position of each bit comprising the additional information ID to be associated with a pixel position in the image data I in which each bit is embedded.

The basic-matrix generating unit 901 can selectively use a plurality of basic matrices. The basic matrix m is changed depending on its purpose and situation. The digital watermark (additional information ID) can appropriately be embedded by changing the basic matrix m.

FIGS. 10A to 10D show examples of the basic matrix m. FIG. 10A shows one example of the basic matrix m, which is used when the additional information ID consisting of 16 bits is embedded. As shown in FIG. 10A, for example, a 4×4 basic matrix m is used to embed the additional information ID consisting of 16 bits, and numbers 1 to 16 are assigned to each component in the basic matrix m.

As shown in FIGS. 10A to 10D, a value of the component in the basic matrix m corresponds to the bit position of the additional information ID. More specifically, bit information (most significant bit) at a bit position "1" of the additional information ID is embedded into the position of a value "1" of the component in the basic matrix m. Similarly, bit information (second most-significant bit) at a bit position "2" of the additional information ID is embedded into the position of a value "2" of the component in the basic matrix m.

FIG. 10B shows another example of the basic matrix m, which is used when the additional information ID consisting of 8 bits is embedded. A basic matrix 1002 is formed by using only the components having numbers 1 to 8 from all components in the basic matrix 1001 of FIG. 10A. The additional information ID is embedded into a portion of the component having numbers of 1 to 8. By dispersing embedding positions of the bits indicating the additional information ID as shown in the example of FIG. 10B, it is difficult to recognize the change in image (deterioration in image quality) due to the digital watermark (additional information ID).

FIG. 10C shows another example of the basic matrix m, which is used when the additional information ID consisting of 8 bits is embedded, similar to the example in FIG. 10B. The examples in FIGS. 10B and 10C are basic matrixes m with which the additional information ID consisting of 8 bits can be embedded. However, with the example in FIG. 10B, 50% of all the pixels are used to is embed to the additional information ID, while with the example in FIG. 10C, all the pixels (100%) are used to embed the additional information ID. That is, the example in FIG. 10B uses one pixel in the basic matrix m so as to embed one bit, and the example in FIG. 10C uses two pixels in the basic matrix m so as to embed one bit, in the additional information ID. As shown by the example in FIG. 10C, when the image in which the digital watermark is embedded is attacked, the digital watermark (additional information ID) can certainly be extracted (can be attack-proof) by increasing the number of embedding incidences of the bits indicating the additional information ID, as compared with the examples of the basic matrix m in FIGS. 10A and 10B.

Hereinafter, a ratio of the pixels used for embedding the digital watermark to all the pixels is called a filling ratio. The filling ratio is 100% in the example of the basic matrix m in FIG. 10A, it is 50% in the example of the basic matrix m in FIG. 10B, and it is 100% in the example of the basic matrix m in FIG. 10C.

FIG. 10D shows an example which is used when all the pixels are used for embedding the additional information ID, similar to the example in FIG. 10C. That is, the filling ratio is 100% in the example in FIG. 10C. Although the additional information ID consisting of 8 bits is embedded in the example in FIG. 10C, the additional information ID consisting of only 4 bits is embedded in the example in FIG. 10D. Therefore, two pixels in the basic matrix m are used for embedding one bit in the example in FIG. 10C. On the other hand, four pixels in the basic matrix m are used for embedding one bit in the additional information ID in the example in FIG. 10D. As shown in the example in FIG. 10D, when the image in which the digital watermark is embedded is attacked, the digital watermark (additional information ID) can be extracted with certainty (can be attack-proof) by increasing the number of embedding times of the bits indicating the additional information ID, as compared with the examples in FIGS. 10A to 10D. However, the amount of information of the embedded additional information ID in the example in FIG. 10D, it is smaller than in the examples in FIGS. 10A to 10C.

The above-mentioned examples in FIGS. 10A to 10D summarized in Table 1.

TABLE 1

| (a) Basic matrix | (b) filling ratio | (c) number of pixels used for embedding 1 bit | (d) number of bits of additional information ID |
|---|---|---|---|
| (a) 1001 | (b) 100% | (c) 1 pixel | (d) 16 bits |
| (a) 1002 | (b) 50% | (c) 1 pixel | (d) 8 bits |
| (a) 1003 | (b) 100% | (c) 2 pixels | (d) 8 bits |
| (a) 1004 | (b) 100% | (c) 4 pixels | (d) 4 bits |

As represented in Table 1, the filling ratio (b), the number of pixels used for embedding one bit (c), and number of bits of additional information ID (d) can selectively be set depending on the configuration of the basic matrix m. Referring to Table 1, the filling ratio (b) is mainly a parameter that affects the image quality of the image in which the digital watermark is embedded, and the number of pixels used for embedding one bit (c) is mainly a parameter which affects how attack proof the digital watermark is. If the filling ratio is increased, the deterioration in image quality of the image that includes the digital watermark is increased. If the number of pixels used for embedding one bit is increased, the attack resistance is stronger.

As will be understood by the above discussion, there is a trade-off relationship among the image quality of the image into which the additional information ID is embedded, the attack resistance of the digital watermark, and the amount of information of the embedded additional information ID.

By appropriately selecting a plurality of the basic matrixes m, the attack resistance of the digital watermark, the image quality, and the amount of information can be set. The above-generated basic matrix m is outputted to the pseudo random-number assigning unit 903.

A function of the pseudo random-number generating unit 902 will be described next. The key information k is inputted to the pseudo random-number generating unit 902 and a pseudo random-number string r is generated based on the key information k. The pseudo random-number string r is a real number string according to a uniform distribution included within a range of [−1, 1]. Further, the key information k is used as an initial value when the pseudo random-number is generated. In other words, a first pseudo random-number string generated by using first key-information is different from a second pseudo random-number string generated by using second key-information. A method for generating the pseudo random-number string r is a well-known technique and, therefore, a detailed description thereof is omitted. The generated pseudo random-number string r is outputted to the pseudo random-number assigning unit 903.

A function of the pseudo random-number assigning unit 903 will be described next. The basic matrix m and the pseudo random-number string r are inputted to the pseudo random-number assigning unit 903, and each component in the pseudo random-number string r is assigned to a predetermined component in the basic matrix m. Thereafter, a matrix in which a random-number string is assigned to the predetermined component in the basic matrix r is referred to as a digital watermark w. The generated digital watermark w is outputted from the pseudo random-number assigning unit 903.

Next, a description is given of a detailed process for assigning each component in the pseudo random-number string r to the predetermined component with reference to an example.

First, the example of the basic matrix shown in FIG. 10D is used. As mentioned above, the 4-bit information can be embedded by using the basic matrix m of FIG. 10D.

A component having "1" is sequentially scanned in the raster scanning order among the components in the basic matrix 1004, and each component in the pseudo random-number string r is sequentially assigned. In the assignment process, if the bit in the additional information ID is "1", the component in the pseudo random-number string r is assigned corresponding to the additional information ID. If the bit in the additional information ID is "0", a value is obtained by multiplying "−1" to the component in the pseudo random-number string r.

Next, the component having "2" is subjected to the above-mentioned processing. Processing continues up to the component having "n" (where n is the number of embedded bits). FIG. 11 is a diagram showing one example of the generated digital watermark w with reference to the above-shown example. Referring to FIG. 11, a digital watermark w 1101 is an example of the digital watermark generated in the above examples. The digital watermark w 1101 is formed by using a real-number string of r={0.7, −0.6, −0.9, 0.8} as the pseudo random-number string r and 4-bit information "1001" as the additional information ID.

The thus-generated digital watermark w is outputted as an output of the digital watermark generating unit 804, and is inputted to the digital watermark embedding unit 805.

The 4×4 basic matrix is used for embedding the 16-bit, 8-bit, and 4-bit additional information in the above descriptions. However, the present invention is not limited to this and the basic matrix may be larger in size by using many pixels for embedding one bit. In the case of using the basic matrix of a larger size, the real-number string is longer than the pseudo random-number string. Actually, processing for embedding the digital watermark, which will be described later, might not be correctly performed in the random-number string consisting of 4 components. Therefore, a "256×256" basic matrix is used with a filling ratio 50% to embed 64-bit additional information (in this case, 512 pixels are used for embedding one bit).

Next, a function of the digital watermark embedding unit 805 will be described. The digital watermark embedding unit 805 embeds the digital watermark w into the image data I by using the inputted image data I and digital watermark w.

The digital watermark embedding unit 805 executes the processing for embedding the digital watermark in accordance with an "Expression 1" of $[I'_{ij}=I_{ij}+aw_{ij})$. Herein, it is assumed that a parameter $I'_{ij}$ denotes the image data in which the digital watermark is embedded, a parameter $I_{ij}$ denotes the image data in which the digital watermark is not embedded, a parameter $w_{ij}$ denotes the digital watermark, parameters i and j denote the x coordinate and the y coordinate of the parameters I and I', and a parameter a denotes an intensity of the digital watermark.

For example, the parameter a is set to "10". Although a digital watermark having strong attack resistance can be embedded by increasing the value of the parameter a, deterioration in image quality is increased. On the other hand, if the digital watermark having weak attack resistance can be embedded by setting the parameter a to be decreased, the deterioration in image quality is decreased. By appropriately setting the value of the parameter a similarly to the configuration of the above-mentioned basic matrix m, the balance between the attack resistance of the digital watermark and the image quality after embedding the digital watermark can be set.

Figures 12, 13:
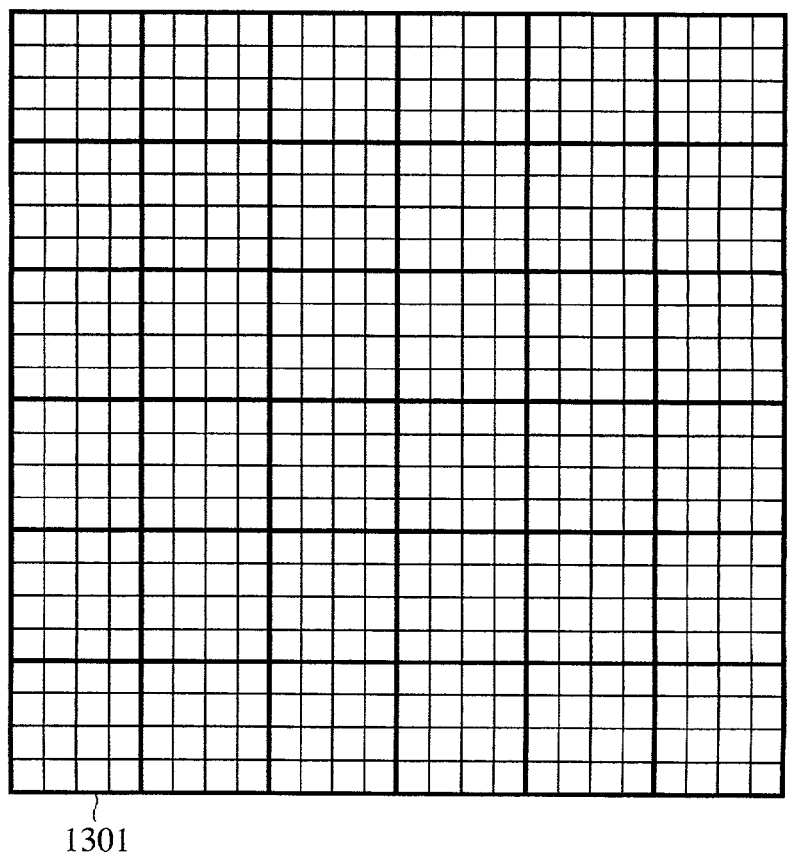
FIG. 12 is a schematic diagram showing an example in which a 4×4 basic matrix m is used in a process for embedding a digital watermark represented by Expression 1.
FIG. 13 is a diagram schematically showing image data I of 24×24 pixels.

FIG. 12 is a diagram showing examples of the 4×4 basic matrix m in a process for embedding the digital watermark represented by Expression 1. Referring to FIG. 12, reference numeral 1201 denotes image data I', reference numeral 1202 denotes the image data I, and reference numeral 1203 denotes the digital watermark w in Expression 1. As shown in FIG. 12, the components in the basic matrix m are subjected to the calculation based on Expression 1.

The overall image data I is repeatedly subjected to the calculation based on Expression 1 in FIG. 12. FIG. 13 is a diagram showing the inputted image data I consisting of 24×24 pixels.

Referring to FIG. 13, the inputted image data I is divided into blocks each of which consists of 4×4 pixels and are not overlapped with each other. The divided blocks are repeatedly subjected to the calculation based on Expression 1 in FIG. 12. Hereinafter, the block subjected to the calculation based on Expression 1 in FIG. 12 is referred to as a macro block.

All the macro blocks are repeatedly subjected to the processing for embedding the digital watermark and, thereby, the digital watermark can be embedded into the overall image data. Further, the overall additional information ID comprising n bits is embedded to one macro block. Therefore, if at least one macro block exists, the embedded additional information ID can be embedded. In other words, the overall image data I is not necessary for extracting the embedded additional information ID and, sufficiently, a part of the image data I (at least one macro block) can be used.

The complete extraction of the digital watermark from a part of the image data I is called "attack resistance against trimming". The overall image is repeatedly subjected to the processing for embedding the digital watermark on a macroblock unit and, thereby, the attack resistance against the trimming can be held. The thus-generated image I', in which the digital watermark is embedded, is outputted via the image output unit 806 as a final output of the digital watermark embedding unit 303.

(6) Extraction of Digital Watermark

Figure 14:
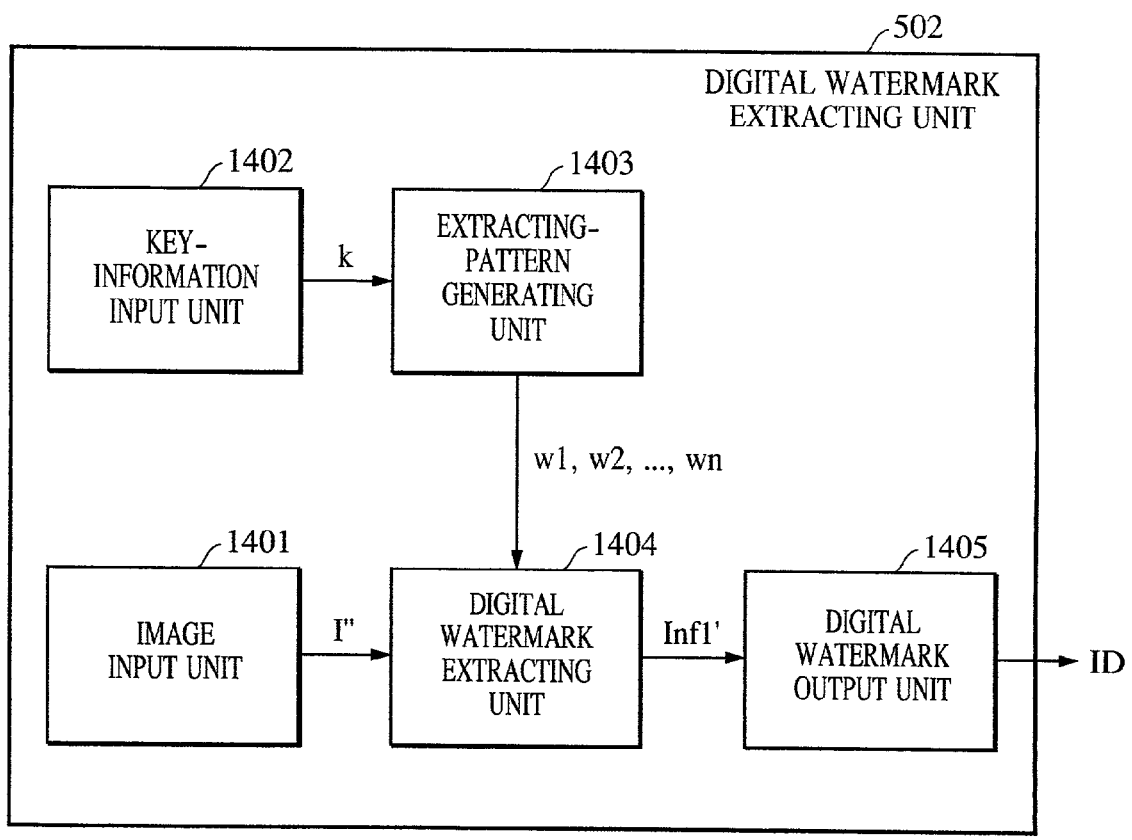
FIG. 14 is a block diagram showing a functional configuration of a digital watermark extracting unit 502 according to the embodiment.

Next, a description is given of a method for extracting the digital watermark embedded as mentioned above. The digital watermark extracting unit 502 will be described according to the embodiment with reference to FIG. 14. FIG. 14 is a block diagram showing a functional configuration of the digital watermark extracting unit 502.

Referring to FIG. 14, the digital watermark extracting unit 502 according to the embodiment includes an image input unit 1401, a key-information input unit 1402, an extracting-pattern generating unit 1403, a digital watermark extracting unit 1404, and a digital watermark output unit 1405.

The processing for extracting the digital watermark described herein may be realized by a software process. In this case, it is assumed that the above components have conceptual functions necessary for the software process.

First, a function of the image input unit 1401 will be described. The image data I" in which the digital watermark might be embedded is inputted to the image input unit 1401. An output of the image input unit 1401 is inputted to the digital watermark extracting unit 1404. The operation of the image input unit 1401 is the same as that of the image input unit 801 and, therefore, a detailed description thereof is omitted. Then, the image data I" inputted by the image input unit 1401 is not limited to the image data (I') in which the digital watermark is embedded by the above processing for embedding the digital watermark. The image data I" may be the image data I' in which the digital watermark is embedded or may be an image in which the image data I' is attacked. Further, the image data I" may be the image data I in which the digital watermark is not embedded.

Next, a function of the key-information input unit 1402 will be described. The key information k for extracting the digital watermark is inputted to the key-information input unit 1402. An output of the key-information input unit 1402 is inputted to the extracting-pattern generating unit 1403. The inputted key-information k must be the same as the key information which is inputted by the key-information input unit 803 in the above-mentioned processing for extracting the digital watermark. If different key-information is inputted to the extracting-pattern generating unit 1403, the correct additional information cannot be extracted. That is, only a user having the correct key-information k can extract the correct additional information ID.

Next, a function of the extracting-pattern generating unit 1403 will be described. The key information k is inputted to the extracting-pattern generating unit 1403 from the key-information generating unit 1402. The extracting pattern is generated based on the inputted key-information k, and the generated extracting-pattern is outputted.

Processing of the extracting-pattern generating unit 1403 will be described in detail next, with reference to FIG. 15. FIG. 15 is a diagram showing a basic structure of the extracting-pattern generating unit 1403. Referring to FIG. 15, the extracting-pattern generating unit 1403 includes a basic-matrix generating unit 1501, a pseudo random-number generating unit 1502, and a pseudo random-number assigning unit 1503.

The operation of the basic-matrix generating unit 1501 is the same as that of the basic-matrix generating unit 901 and, further, the operation of the pseudo random-number generating unit 1502 is the same as that of the pseudo random-number generating unit 902. Therefore, a detailed description thereof is omitted. However, the correct additional information can be extracted only if the basic matrix generated by the basic-matrix generating unit 1501 is the same as the basic matrix generated by the basic-matrix generating unit 901.

A function of the pseudo random-number assigning unit 1503 will be described in detail next. The basic matrix m and the pseudo random-number string r are inputted to the pseudo random-number assigning unit 1503. The components in the pseudo random-number string r are assigned to predetermined components in the basic matrix m. The pseudo random-number assigning unit 903 outputs one extracted digital watermark w. Unlike the pseudo random-number assigning unit 903 used in the above-mentioned processing for embedding the digital watermark, the pseudo random-number assigning unit 1503 outputs the amount of embedded information (corresponding to n bits of the additional information ID in the embodiment).

Next, a detailed description is given of a function for assigning the components in the pseudo random-number string r to predetermined components in the basic matrix m with reference to an example. The example of the basic matrix m shown in FIG. 10D is used herein. If the example of the basic matrix m 1004 is used, 4-bit additional information can be embedded and four extracting patterns w1 to w4 are outputted.

First, components having "1" are scanned in order of raster scanning from the components in the example 1004 of the basic matrix m, and the components in the pseudo random-number string r are assigned to the scanned components. After assigning the components in the pseudo random-number string r to all the components having "1" from the components in the example 1004 of the basic matrix m, a matrix to which the pseudo random-number string r is assigned is generated as the extracting pattern w1. FIGS. 16A to 16D show examples of extracting patterns. The extracting pattern w1 (an example 1601 of the basic matrix m in FIG. 16A) is an example of using a real-number string of r={0.7, −0.6, −0.9, 0.8} as the pseudo random-number string r. All the components having "2", "3", and "4" are subjected to the above-mentioned processing from the components in the example of the basic matrix m in FIG. 10D, and the extracting pattern w2 (an example 1602 of the basic matrix m in FIG. 16B), the extracting pattern w3 (an example 1603 of the basic matrix m in FIG. 16C), and the extracting pattern w4 (an example 1604 of the basic matrix m in FIG. 16D) are generated. A pattern obtained by adding the generated extracting-patterns w1 to w4 is equal to the digital watermark w used in the digital watermark processing unit. The generated extracting-patterns w1 to w4 are outputted from the extracting-pattern generating unit 1403 and is inputted to the digital watermark extracting unit 1404.

Next, a function of the digital watermark extracting unit 1404 will be described. The image data I' and the extracting patterns w1 to wn are inputted to the digital watermark extracting unit 1404, the additional information ID is extracted from the image data I" by using the extracting patterns w1 to wn, and the extracted additional information ID is outputted. Preferably, the extracted additional information ID is equal to the embedded additional information ID. However, when the image data I' in which the digital data is embedded has been attacked, the extracted additional information may not match the embedded additional information ID.

Next, a function of the digital watermark extracting unit 1404 will be described in detail. In the digital watermark extracting unit 1404, correlations of the integrating image c generated from the inputted image data I" with the extracting patterns w1 to wn are calculated. The integrating image c is an image obtained by dividing the inputted image data I" into blocks with the size of the macro block (the size of the basic block), which are not overlapped with each other, and an average of the values (pixel values) of the components in each divided block is calculated.

The integrating image c will be described with reference to FIG. 17. FIG. 17 is a diagram schematically showing an example of the integrating image c when inputting an extracting pattern consisting of 4×4 pixels and the image data I" having 24×24 pixels. Referring to FIG. 17, reference numeral 1701 denotes an example of divided blocks consisting of 4×4 pixels, which are obtained by dividing the image data I' consisting of 24×24 pixels. In the example 1701 in FIG. 17, the image data I' is divided into 36 blocks. The average of the values of the components in the 36 blocks is the integrating image c (as a divided block 1702).

Each of the correlations of the thus-generated integrating image c with the extracting patterns w1 to wn is calculated. A specific method for calculating a correlation coefficient will be described next with an example of calculating the correlation coefficient between the integrating image c and the extracting pattern wn.

The correlation coefficient is a statistical amount for measuring the similarity between the integrating image c and the extracting pattern wn, and is expressed by $[\rho = c'^T \cdot w'n / |c'^T||w'n|]$ (referred to herein as Expression 2). Herein, a parameter c' and a parameter w'n represent matrices having components obtained by subtracting the average of the components in each matrix from the component. A parameter $\rho$ lies within a range of −1 to +1. When a positive correlation between the integrating image c and the extracting pattern w'n is strong, the parameter $\rho$ is near +1. On the other hand, when a negative correlation between the integrating image c and the extracting pattern w'n is strong, the parameter $\rho$ is near −1. When the positive correlation is strong, the integrating image c is larger and the extracting pattern wn is larger. When the negative correlation is strong, the integrating image c is stronger, and the extracting pattern wn is larger. When the integrating image c does not correlate to the extracting pattern w'n, the parameter $\rho$ is zero.

It is determined based on the calculation of the correlation coefficient whether or not the additional information ID is embedded to the inputted image data I" as the digital watermark and whether each bit forming the additional information ID is "1" or "0" when the additional information ID is embedded.

The correlation coefficients of the integrating image c with the extracting patterns w1 to wn are calculated. Then, when a calculated correlation coefficient is near zero, it is determined that the additional information ID is not embedded. When the calculated correlation coefficient is a positive number excluding zero, it is determined that the bit is "1". When the calculated correlation coefficient is a negative number excluding zero, it is determined that the bit is "0".

The above-mentioned calculation of the correlations is equivalent to the similarity between the integrating image c and the extracting patterns w1 to wn. More specifically, when the digital watermark embedding unit embeds the extracting patterns w1 to wn in the image data I" (integrating image c), the integrating image c is relatively similar to the extracting patterns w1 to wn and the similarity is calculated as the correlation coefficient. Further, when the bit "1" is embedded to the image data I" (the extracting patterns w1 to wn are added), the correlation coefficient is positive. On the other hand, when the bit "0" is embedded to the image data I" (the extracting patterns w1 to wn are subtracted), the correlation coefficient is negative.

Figure 18:
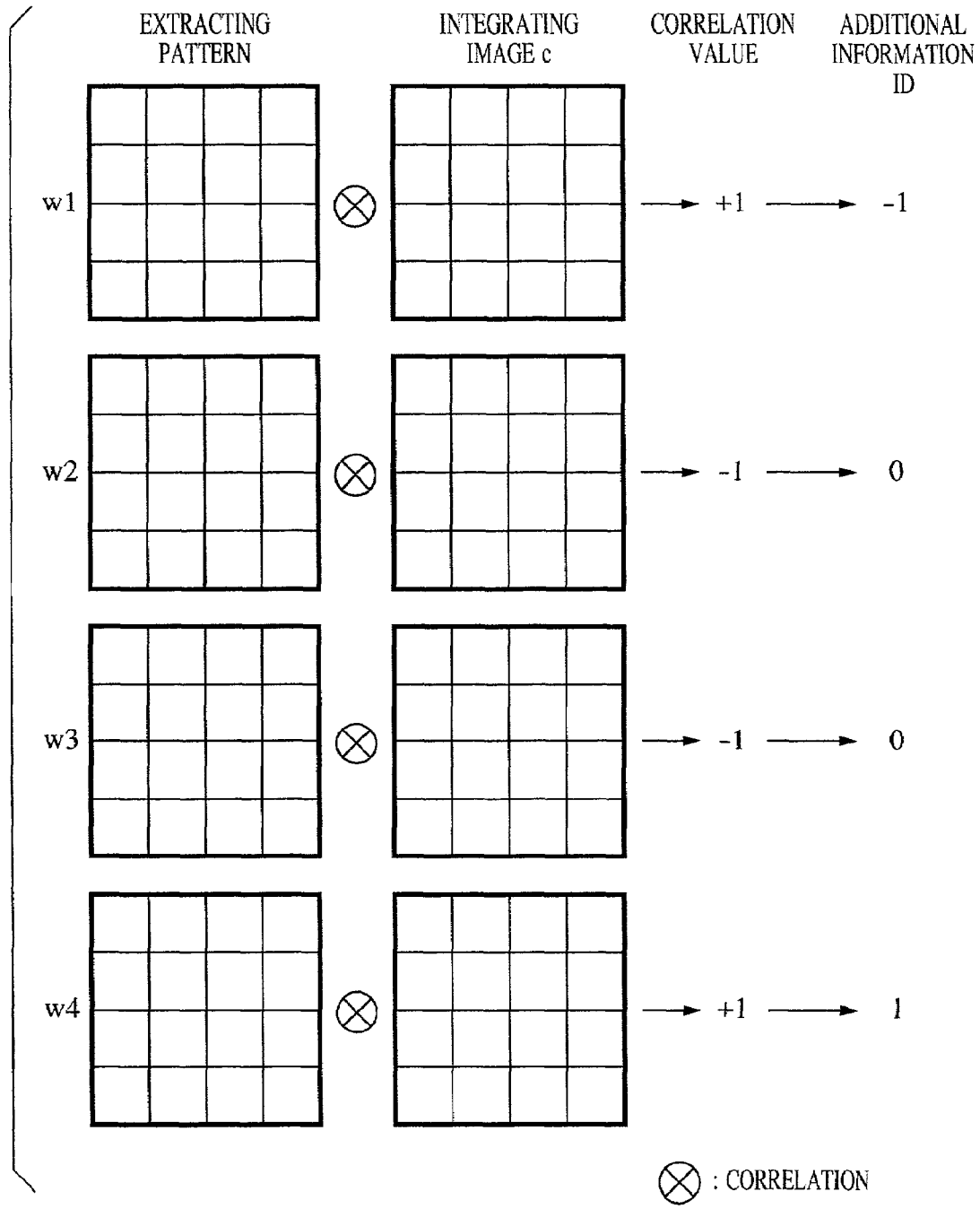
FIG. 18 is a diagram showing an example for explaining hot to extract a digital watermark from the image data I.

Next, a description is given of an example of extracting the digital watermark (additional information) by using the extracting patterns w1 to w4 from the image data I" (integrating image c) to which the 4-bit additional information "1001" is embedded, with reference to FIG. 18.

The correlation coefficients of the integrating image c with the extracting patterns w1 to w4 (corresponding to the 4-bit additional information ID) are calculated. When the additional information ID is embedded in the inputted image data I' (integrating image c), the correlation coefficients are "1", "−1", "−1", and "1". As a result, the additional information ID is determined as "1001" and the 4-bit additional information ID can finally be extracted.

The above-extracted additional information ID consisting of n bits is outputted via the digital watermark output unit 1405. When the image data is subjected to error correction encoding and encryption upon embedding the additional information ID, the digital watermark embedding unit 303 executes error correction decoding and decryption. As a result of the processing for embedding the digital watermark, the obtained information is finally outputted as the binary data string (additional information ID).

Modifications

Although still image data is used as the digital information according to the embodiment, the present invention is not limited to this and can be applied to various digital data such as moving image data, audio data, and text data.

Further, the present invention may be applied to a part of a system comprising a plurality of pieces of equipment such as a host computer, an interface device, a reader, and a printer or to a part of a single equipment such as a copy machine or a facsimile machine.

The present invention is not limited to an apparatus or a system for implementing the above embodiment. The present invention includes the case of implementing the above embodiment by supplying to a computer (CPU or MPU) in the apparatus or the system, program code of software for implementing the above embodiment and by operating the above devices in accordance with the program code by the computer in the system or apparatus.

In this case, the program code itself implements the foregoing embodiment. The program code itself and means for supplying the program code to the computer, for example, a storage medium for storing the program code and the like, are included in the scope of the present invention.

As for the storage medium storing the program code, it is able to use a floppy disk, hard disk, optical disk, magneto-optical disk, CD-ROM, CD-R, magnetic tape, nonvolatile memory card, ROM, and the like.

Obviously, the functions of the aforementioned embodiments can be effected not only by executing the program code, which is read out by the computer, but also by executing a part or all of the actual processes by the OS (Operating System) that operates on the computer, based on the instruction of the program code.

Obviously, the functions of the aforementioned embodiments can further be effected by writing the program code read-out from the storage medium into a memory provided for a function expansion board inserted in the computer or a function expansion unit connected to the computer, and thereafter executing a part or all of the actual processes by a CPU, etc., provided for the function expansion board or function expansion unit based on the instruction of the program code.

As mentioned above, in the present invention, when the image data in which the digital watermark accesses a server, in particular, a Web server, via a network, the server can appropriately be selected in accordance with environments of the client that accesses the server.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A network access terminal, comprising:
   an extraction unit for extracting first information from an image in which the first information is embedded, wherein the first information is an identifier for identifying the image and includes user information and copyright information of the image;
   a generating unit for generating second information related to said network access terminal, wherein the second information is either time information on an access by the network access terminal or information on a type of the network access terminal;
   an acquisition unit for obtaining one set of address information from among a plurality of sets of address information stored in a predetermined storage device, wherein the plurality of the sets are specified by the first information, and the one set of the address information is specified by the first information extracted by said extraction unit and the second information in combination; and
   a communication unit for accessing an address based on the address information obtained by said acquisition unit,
   wherein the acquisition unit acquires different address information for each of the generated second information when they are different, even if the extracted first information is same.

2. A network access terminal according to claim 1, wherein the image is an image in which the first information is embedded as a digital watermark.

3. A network access terminal according to claim 1, wherein the predetermined storage device stores the second information and the one set of address information that is specified by the first and second information, in association with the first information, and
   wherein said acquisition unit obtains the one set of address information specified by the first and second information from the predetermined storage device.

4. A network access terminal according to claim 1, wherein the second information includes location information identifying a location of an access destination.

5. A network access terminal according to claim 1, wherein said communication unit accesses a content server in which content is stored.

6. A network access terminal according to claim 5, wherein the content includes at least one of text information, image information, audio information, and program information.

7. A network system that includes a network access terminal according to claim 1.

8. A network access terminal according to claim 1, wherein the second information includes location information identifying a location of said network access terminal.

9. A network access terminal according to claim 8, wherein the one set of address information accesses a choice of language based on the location information identified by the second information.

10. A network access terminal according to claim 1, wherein the second information includes information identifying what type of device said network access terminal is.

11. A network access terminal according to claim 10, wherein the one set of address information accesses a choice of files based on whether said network access terminal is, respectively, a PC, a cellphone or a PDA.

12. A network access method, comprising the steps of:
   an extraction step of extracting first information from an image in which the first information is embedded, wherein the first information is an identifier for identifying the image and includes user information and copyright information of the image;
   a generating step of generating second information related to a network access terminal, wherein the second information is either time information on an access by a network access terminal or information on a type of the network access terminal;
   an acquisition step of acquiring one set of address information from among a plurality of sets of address information stored in a predetermined storage device, wherein the plurality of the sets are specified by the first information, and the one set of the address information is specified by the first information extracted in said extraction step and the second information in combination; and
   an access step of accessing an address based on the address information obtained in said acquisition step,
   wherein in the acquisition step different address information for each of the generated second information is acquired when they are different, even if the extracted first information is same.

13. A computer-readable storage medium having control logic stored therein for causing a computer to implement a network access method, comprising:
- a computer-readable program code of an extraction step of causing a computer to extract first information from an image in which the first information is embedded, wherein the first information is an identifier for identifying the image and includes user information and copyright information of the image;
- a computer-readable program code of a generating step of causing a computer to generate second information related to a network access terminal, wherein the second information is either time information on an access by a network access terminal or information on a type of the network access terminal;
- a computer-readable program code of an acquisition step of causing a computer to acquire one set of address information from among a plurality of sets of address information stored in a predetermined storage device, wherein the plurality of the sets are specified by the first information, and the one set of the address information is specified by the first information extracted in said extraction step and the second information in combination and
- a computer-readable program code of an access step of causing a computer to access an address based on the address information obtained in the acquisition step, wherein in the acquisition step different address information for each of the generated second information is acquired when they are different, even if the extracted first information is same.

* * * * *